(12) United States Patent
Bennett et al.

(10) Patent No.: US 9,794,807 B2
(45) Date of Patent: Oct. 17, 2017

(54) MANAGEMENT OF BACKHAUL NODES IN A MICROWAVE BACKHAUL

(75) Inventors: James Bennett, Hroznetin (CZ); Jonathan Friedmann, Tel-Aviv (IL)

(73) Assignee: Maxlinear Asia Singapore PTE LTD, Singapore (SG)

(*) Notice: Subject to any disclaimer, the term of this patent is extended or adjusted under 35 U.S.C. 154(b) by 674 days.

(21) Appl. No.: 13/535,668

(22) Filed: Jun. 28, 2012

(65) Prior Publication Data

US 2014/0003332 A1    Jan. 2, 2014

Related U.S. Application Data

(60) Provisional application No. 61/565,469, filed on Nov. 30, 2011.

(51) Int. Cl.
H04W 24/04    (2009.01)
H04W 64/00    (2009.01)
H04W 92/20    (2009.01)

(52) U.S. Cl.
CPC .......... *H04W 24/04* (2013.01); *H04W 64/003* (2013.01); *H04W 92/20* (2013.01)

(58) Field of Classification Search
CPC .... H04W 24/04; H04W 64/003; H04W 92/20
USPC .......................... 370/351, 216, 248, 254, 431
See application file for complete search history.

(56) References Cited

U.S. PATENT DOCUMENTS 6,195,559 B1 *   2/2001   Rapeli et al. ................. 455/500
7,844,010 B2 *   11/2010   Ylitalo et al. ................. 375/267
7,881,752 B1 *   2/2011   Johnson et al. ........... 455/562.1
8,170,544 B1 *   5/2012   Satapathy et al. ............ 455/423
(Continued)

FOREIGN PATENT DOCUMENTS

CN     101401482 A     4/2009
CN     101536373 A     9/2009
(Continued)

OTHER PUBLICATIONS

European Search Report for EP Patent Application No. EP12007699.7, European Patent Office, Munich, Germany, mailed on Nov. 14, 2013.

(Continued)

*Primary Examiner* — Mang Yeung
*Assistant Examiner* — Peter G Solinsky
(74) *Attorney, Agent, or Firm* — McAndrews, Held & Malloy, Ltd.

(57) ABSTRACT

A communications network is disclosed that includes one or more microwave backhaul nodes for routing communications between one or more near end mobile communications devices and one or more far end mobile communications devices. The communications network includes a central monitoring and control infrastructure, a remote monitoring and control infrastructure and/or a local monitoring and control infrastructure. The central monitoring and control infrastructure, the remote monitoring and control infrastructure and/or the local monitoring and control infrastructure can directly manage the one or more microwave backhaul nodes. Alternatively, the remote monitoring and control infrastructure and/or the local monitoring and control infrastructure can indirectly manage the one or more microwave backhaul nodes through the central monitoring and control infrastructure.

24 Claims, 6 Drawing Sheets

(56) References Cited

U.S. PATENT DOCUMENTS

| | | | |
|---|---|---|---|
| 8,213,994 B2 * | 7/2012 | Cave et al. | 455/562.1 |
| 8,233,433 B2 * | 7/2012 | Kalhan | 370/328 |
| 8,385,305 B1 * | 2/2013 | Negus et al. | 370/338 |
| 8,391,878 B2 | 3/2013 | Tenny | |
| 8,842,050 B2 * | 9/2014 | Livneh et al. | 343/702 |
| 2003/0161261 A1 * | 8/2003 | Weis | 370/221 |
| 2004/0009792 A1 * | 1/2004 | Weigand | H04L 12/2602 |
| | | | 455/561 |
| 2007/0218910 A1 | 9/2007 | Hill et al. | |
| 2008/0151745 A1 * | 6/2008 | Rahm | 370/221 |
| 2010/0067476 A1 | 3/2010 | Periyalwar et al. | |
| 2010/0187224 A1 * | 7/2010 | Hyde et al. | 219/720 |
| 2011/0080985 A1 | 4/2011 | Secker et al. | |
| 2011/0109501 A1 * | 5/2011 | Corman | H01P 1/122 |
| | | | 342/354 |
| 2011/0164527 A1 * | 7/2011 | Mishra et al. | 370/252 |
| 2011/0206095 A1 * | 8/2011 | Beeler | H04B 7/18515 |
| | | | 375/211 |
| 2012/0094594 A1 * | 4/2012 | Rofougaran et al. | 455/15 |
| 2012/0319895 A1 * | 12/2012 | Bruchiel | H01Q 3/04 |
| | | | 342/357.36 |
| 2012/0320731 A1 * | 12/2012 | Johnson | 370/216 |
| 2013/0040594 A1 * | 2/2013 | Vilhar | G01R 29/10 |
| | | | 455/226.4 |
| 2013/0040655 A1 * | 2/2013 | Keidar | 455/456.1 |
| 2013/0095846 A1 * | 4/2013 | Brisebois | H04W 16/28 |
| | | | 455/456.1 |
| 2014/0200045 A1 * | 7/2014 | Jalali et al. | 455/522 |

FOREIGN PATENT DOCUMENTS

| | | | | |
|---|---|---|---|---|
| EP | 1 298 848 A2 | 4/2003 | | |
| EP | 1298848 A2 * | 4/2003 | | H04L 12/28 |
| KR | 10-2006-0092935 | 8/2006 | | |
| WO | WO 2009/014764 A1 | 1/2009 | | |
| WO | WO 2012/045059 A1 | 4/2012 | | |

OTHER PUBLICATIONS

Office Action for related Korean Patent Application No. 10-2012-0137908, mailed Feb. 25, 2014; 4 pages.
Office Action for related Taiwanese Patent Application No. 101140962, mailed Mar. 24, 2014; 8 pages.
English-language Abstract for Korean Patent Application Publication No. 10-2006-0092935; 2 pages.
Office Action directed to related Chinese Patent Application No. 201210501975.3, mailed on Dec. 3, 2014; 8 pages.
Ridel et al., "Phased Array Feeder (PAF) for Point to Point Links", U.S. Appl. No. 13/435,604, filed Mar. 30, 2012.
Friedmann et al., "Communication Pathway Supporting an Advanced Split Microwave Backhaul Architecture", U.S. Appl. No. 13/535,196, filed Jun. 27, 2012.

* cited by examiner

MANAGEMENT OF BACKHAUL NODES IN A MICROWAVE BACKHAUL

CROSS REFERENCE TO RELATED APPLICATIONS

This patent application claims the benefit of U.S. Provisional Patent Application No. 61/565,469, filed Nov. 30, 2011.

BACKGROUND

Field of Disclosure

The present disclosure relates generally to microwave backhauls and specifically management of microwave backhauls.

Related Art

A conventional communications network includes a conventional microwave line-of-sight backhaul to allow for communication of information, such as audio, video, or data to provide some examples, between one or more near end mobile communications devices and one or more far end mobile communications devices. The conventional microwave line-of-sight backhaul represents an interconnected network of microwave relays and/or microwave switches, which allows for communication between the near end mobile communications devices and the far end mobile communications devices using various microwave pathways. The conventional microwave line-of-sight backhaul includes one or more conventional backhaul nodes to route communications between the near end mobile communications devices and the far end mobile communications devices.

The conventional backhaul nodes are conventionally mounted on very large, stable ground-based masts, rooftops, and other existing structures, at vast distances apart at a height that provides a clear view over the surrounding buildings and terrain to form a macrocell. These vast distances require narrow beams of various antenna elements of the conventional backhaul nodes to be aimed very accurately, within the line-of-sight of one another, to meet network demands, such as quality of service (QoS) to provide an example. Aiming of the various antenna elements of the conventional backhaul nodes is entirely a mechanical process whereby an installer simply adjusts a direction, such as azimuth, altitude, pitch, roll, and/or yaw to provide some examples, of the various antenna elements until reaching maximum signal strength. Additionally, the conventional backhaul nodes conventionally operate at high power levels, typically high powered, narrow beams, to allow for their communications to traverse the vast distances between them.

However, environmental factors, such as wind to provide an example, can cause movement, such as jitter or vibration, of the conventional backhaul nodes as well as their associated high power, narrow beams. These environmental factors, as well as other environmental factors, such obstructions from buildings and terrain, for example, tree branches, can cause signal strengths of the conventional backhaul nodes to fluctuate, thereby making aiming of these high powered, narrow beams rather difficult. Additionally, these environmental factors can cause redirection of the high power, narrow beams of the antennas even after being properly aimed. In these situations, the high power levels of the conventional backhaul nodes are further increased to compensate for these environmental factors to maintain the network demands. The redirection of the high power, narrow beams in this manner can cause high powered microwave radiation to be directed directly at populated areas.

Additionally, loss of one or more conventional backhaul nodes can be devastating for the conventional microwave line-of-sight backhaul. For example, one or more conventional backhaul nodes can become inoperative as a result of the environmental factors. As a result, the conventional microwave line-of-sight backhaul can no longer be able to meet the network demands when one or more of the conventional backhaul nodes become inoperative due to the relatively limited number of the conventional backhaul nodes within the conventional microwave line-of-sight backhaul.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1A:
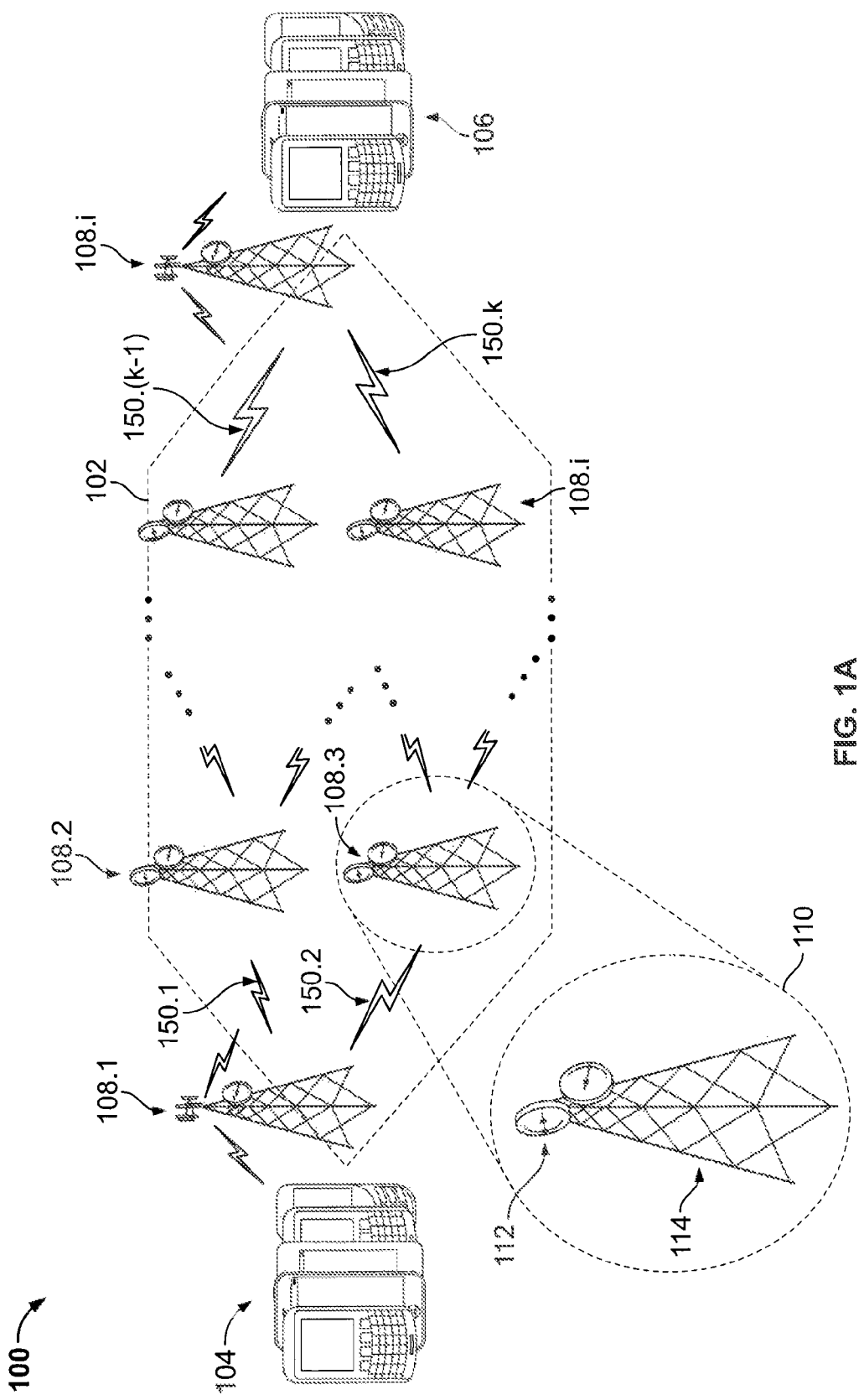
FIG. 1A illustrates a block diagram of a conventional microwave line-of-sight backhaul.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Conventional Microwave Line-of-Sight Backhaul Pathway

FIG. 1A illustrates a block diagram of a conventional microwave line-of-sight backhaul. A conventional communications network 100 includes a conventional microwave line-of-sight backhaul 102 to allow for communication of information, such as audio, video, or data to provide some examples, between one or more near end mobile communications devices 104 and one or more far end mobile communications devices 106.

The near end mobile communications devices 104 and the far end mobile communications devices 106 can represent one or more mobile telephony devices, such as one or more mobile phones, one or more mobile computing devices, one or more mobile internet devices, one or more personal digital assistants, one or more handheld game consoles, one or more portable media players, one or more digital still cameras, one or more digital video cameras, one or more pagers, one or more personal navigation devices, one or more tablet computers, and/or any other suitable communications device that is capable of wireless communication within the conventional microwave line-of-sight backhaul 102. As shown in FIG. 1, the near end mobile communications devices 104 and the far end mobile communications devices 106 wirelessly exchange the information using the microwave line-of-sight backhaul 102. Although not shown in FIG. 1, the conventional microwave line-of-sight backhaul 102 can be communicative coupled to various other conventional backhauls, such as a fiber optic backhaul or a cable backhaul to provide some examples.

The conventional microwave line-of-sight backhaul 102 represents an interconnected network of microwave relays and/or microwave switches, which allows for communication between the near end mobile communications devices 104 and the far end mobile communications devices 106 using various microwave pathways 150.1 through 150.$k$. The conventional microwave line-of-sight backhaul 102 includes one or more conventional backhaul nodes 108.1 through 108.$i$ to route communications between the near end mobile communications devices 104 and the far end mobile communications devices 106. Typically, one or more of the conventional backhaul nodes 108.1 through 108.$i$, such as the conventional backhaul node 108.1 to provide an example, can include a conventional outdoor unit (ODU) to communicate with a conventional indoor unit (IDU) that is in communications with the near end mobile communications devices 104 and/or the far end mobile communications devices 106. The conventional IDU can additionally function as a communications bridge to pass communications from the near end mobile communications devices 104 and/or the far end mobile communications devices 106 to their respective ODUs.

One of the conventional backhaul nodes 108.1 through 108.$i$ is further illustrated in an exploded view 110. As shown in the exploded view 110, the conventional backhaul nodes 108.1 through 108.$i$ conventionally includes various antenna elements 112 that are mounted onto a fixed, highly stable location 114. The fixed, highly stable location 114 represents any very large, stable ground-based mast, rooftop, and other existing structure. Conventionally, the various antenna elements 112 from one conventional backhaul node 108.1 through 108.$i$ are at vast distances apart from various antenna elements 112 of another conventional backhaul node 108.1 through 108.$i$ at a height that provides a clear view over the surrounding buildings and terrain to form a macrocell. These vast distances require narrow beams of the various antenna elements 112 of the conventional backhaul nodes 108.1 through 108.$i$ to be aimed very accurately, within the line-of-sight of one another, to meet network demands, such as quality of service (QoS) to provide an example. Aiming of the various antenna elements 112 of the conventional backhaul nodes 108.1 through 108.i is entirely a mechanical process whereby an installer simply adjusts a direction, such azimuth, altitude, pitch, roll, and/or yaw to provide some examples, of the various antenna elements until reaching maximum signal strength. Additionally, the conventional backhaul nodes 108.1 through 108.i conventionally operate at high power levels, typically high powered, narrow beams, to allow for their communications to traverse the vast distances between them.

However, environmental factors, such as wind to provide an example, can cause movement, such as jitter or vibration, of the conventional backhaul nodes 108.1 through 108.i as well as their associated high power, narrow beams. These environmental factors, as well as other environmental factors, such obstructions from buildings and terrain, for example, tree branches, can cause signal strengths of the conventional backhaul nodes 108.1 through 108.i to fluctuate, thereby making aiming of these high powered, narrow beams rather difficult. Additionally, these environmental factors can cause redirection of the high power, narrow beams of the antennas even after being properly aimed. In these situations, the high power levels of the conventional backhaul nodes 108.1 through 108.i are further increased to compensate for these environmental factors to maintain the network demands. The redirection of the high power, narrow beams in this manner can cause high powered microwave radiation to be directed directly at populated areas. For example, these environmental factors can cause the various antenna elements 112 of the conventional backhaul nodes 108.1 through 108.i to sag over time which requires these various antenna elements 112 to be manually re-aimed on site.

Additionally, loss of one or more conventional backhaul nodes 108.1 through 108.i can be devastating for the conventional microwave line-of-sight backhaul 102. As a result, the conventional microwave line-of-sight backhaul 102 can no longer be able to meet the network demands when one or more of the conventional backhaul nodes 108.1 through 108.i become inoperative due to the relatively limited number of the conventional backhaul nodes 108.1 through 108.i within the conventional microwave line-of-sight backhaul 102. For example, one or more conventional backhaul nodes 108.1 through 108.i can become inoperative as a result of the environmental factors. As another example, failure of certain components, such as the various antenna elements 112 and their associated electronics to provide some examples, of one or more conventional backhaul nodes 108.1 through 108.i cause these conventional backhaul nodes 108.1 through 108.i to become inoperative. In each of these examples, the conventional backhaul nodes 108.1 through 108.i remain inoperative until on site repairs are complete. In some situations, the communications can be re-routed to bypass these inoperative conventional backhaul nodes 108.1 through 108.i by reconfiguring the various microwave pathways 150.1 through 150.k which can slow down of communications within the conventional communications network 100. However, in other situations, the various microwave pathways 150.1 through 150.k must pass through these inoperative conventional backhaul nodes 108.1 through 108.i which can completely stop communications within the conventional communications network 100 until on site repairs are complete.

Advancement in Backhaul Nodes

Recent advancements in microwave backhaul nodes have dramatically altered complexity of conventional microwave backhauls, such as the conventional microwave line-of-sight backhaul 102 to provide an example. A first advancement is the use of a phased array feeder (PAF) for communications among the microwave backhaul nodes as described in U.S. patent application Ser. No. 13/435,604, filed Mar. 30, 2012, which is incorporated by reference herein in its entirety. Unlike various antenna elements of the conventional microwave backhauls, the PAF is configurable to be dynamically aimed. The PAF represents a reconfigurable array of element antennas that is configurable to receive energy in a desired direction and to suppress energy in an undesired direction. The reconfigurable array is configurable to provide various microwave pathways to various microwave backhaul nodes. For example, the reconfigurable array can be configurable to provide a microwave pathway for communications to one microwave backhaul node, commonly referred to as point-to-point.

As another example, the reconfigurable array can be configurable to provide more than one microwave pathway for communications to more than one microwave backhaul node, commonly referred to as point-to-multipoint. In this other example, the reconfigurable array can be physically or logically, in time and/or frequency, separated to provide these microwave pathways. For example, this logical time separation can include one or more configurations, such as from full-duplex PAF to a first microwave backhaul node for approximately fifty percent of the time to a half-duplex PAF to a second microwave backhaul node for approximately twenty-five percent of the time to a half-duplex PAF to a third microwave backhaul node for approximately twenty-five percent of the time.

Second, this configurability of the PAF allows the microwave backhaul nodes to be mounted on flimsy, less stable locations such as light poles, traffic signs, telephone pole, and/or sides of short buildings to provide some examples. This ability to mount the microwave backhaul nodes on less stable structures allows microwave backhaul nodes to be placed at closer distances when compared to the conventional backhaul nodes, to form microcells. As a result of this increased density, the microwave backhaul nodes can operate at lower power levels and/or lower mounting heights when compared to the conventional backhaul nodes.

Additionally, this configurability of the PAF allows the microwave backhaul nodes to operate in environmental conditions while meeting network demands that would otherwise affect the conventional backhaul nodes. For example, when a microwave backhaul node fails or becomes inoperative, a replacement microwave backhaul node can be mounted onto any nearby structure with re-aiming of PAFs of its destination microwave backhaul node being a part of the process. Further, this configurability of the PAF allows various functions of the microwave backhaul node to be controlled centrally, such as allowing for installation, supporting breakdown, or supporting heavy loading for dynamic rerouting through other PAF pathways to provide some examples. This central controlling of the microwave backhaul node allows communications with this microwave backhaul node as well as other microwave backhaul nodes within the microwave backhaul to be dynamically re-routed in real time. This dynamic re-routing of communications within the microwave backhaul can be in response to network demands and/or environmental conditions.

Further, these closer distances between the microwave backhaul nodes permit merger of different radio access technologies, such as Institute of Electrical and Electronics Engineers (IEEE) 802.16 family of wireless-networks standards, commonly referred to as Worldwide Interoperability for Microwave Access (WiMAX), a 3GPP Long Term Evolution (LTE) communications standard, or a Wi-Fi communications standard to provide some examples, into the microwave backhaul nodes and can include bridging and switching related thereto. The central controlling of the microwave backhaul node can also be used to centrally control the bridging and switching of these different radio access technologies. A failure or malfunction at the microwave backhaul node due to these different radio access technologies can be centrally monitored and/or managed.

Third, the IDU has been integrated with the ODU within the microwave backhaul nodes as described in U.S. patent application Ser. No. 13/535,196, filed Jun. 27, 2012, which is incorporated by reference herein in its entirety. The integration of the IDU and the ODU reduces a size of the microwave backhaul nodes when compared to the conventional backhaul nodes. This reduction in the size of the microwave backhaul nodes allows these microwave backhaul nodes to be mounted on the flimsy, less stable locations when compared to the conventional backhaul nodes that are mounted on very large, stable structures.

Backhaul Pathways that Use these Advances in Backhaul Nodes

Figure 1B:
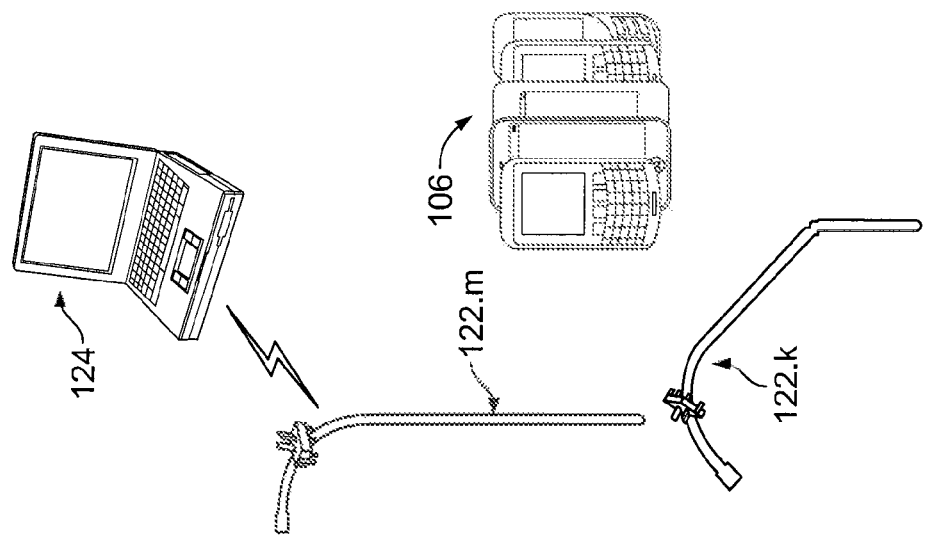
FIG. 1B illustrates a block diagram of a microwave backhaul according to an exemplary embodiment of the present disclosure.
Figure 1B:
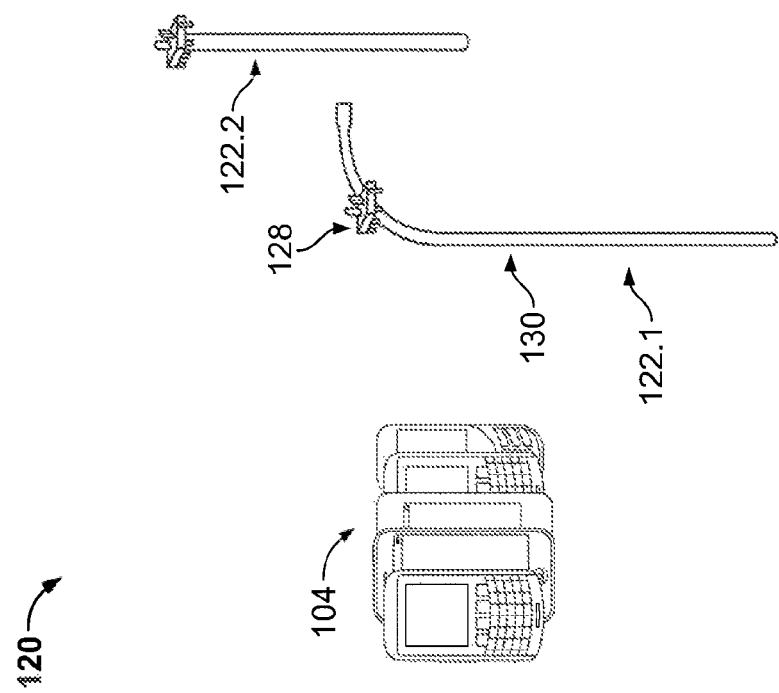

FIG. 1B illustrates a block diagram of a microwave backhaul according to an exemplary embodiment of the present disclosure. A communications network 120 provides allows for communication of information, such as audio, video, or data to provide some examples, between the one or more near end mobile communications devices 104 and the one or more far end mobile communications devices 106. The communications network 120 includes microwave backhaul nodes 122.1 through 122.k for routing of communications between the one or more near end mobile communications devices 104 and the one or more far end mobile communications devices 106.

Each of the microwave backhaul nodes 122.1 through 122.k include a microwave backhaul node 128 mounted onto a flimsy, less stable location such as a light pole 130 to provide an example. The microwave backhaul node 128 includes one or more dynamically configurable PAFs for routing communications among the microwave backhaul nodes 122.1 through 122.k and bridges and switches for supporting communications between mobile communications devices and the microwave backhaul nodes 122.1 through 122.k.

As shown in FIG. 1B, the microwave backhaul nodes 122.1 through 122.k can operate in the environmental conditions. In some situations, these environmental conditions can cause a failure or a malfunction of one of the microwave backhaul nodes 122.1 through 122.k, such as the microwave backhaul node 122.k to provide an example. In this situation, a central management module 124 can dynamically reconfigure the communications network 120 to bypass the failed or malfunctioning microwave backhaul node. For example, communications between the microwave backhaul node 122.1 and the microwave backhaul node 122.k can be re-routed to the microwave backhaul node 122.m by the central management module 124.

In other situations, the microwave backhaul node 122.m can represent a newly installed microwave backhaul node within the communications network 120 that is dynamically configured to route communications between the one or more far end mobile communications devices 106 and the microwave backhaul nodes 122.1 through 122.k. The central management module 124 can provide various services to the communications network 120 for assisting an installer in aiming the one or more dynamically configurable PAFs of the microwave backhaul node 122.m toward other dynamically configurable PAFs of other microwave backhaul nodes 122.1 through 122.k. This assistance can include aiming at least a first portion of one of the dynamically configurable PAFs of the microwave backhaul node 122.m toward a second portion of another dynamically configurable PAF of another microwave backhaul node 122.1 through 122.k.

For example, the central management module 124 can gather location information for the microwave backhaul nodes 122.1 through 122.k. This location information can include orientation, compass coordinates such as longitude and/or latitude, azimuth, altitude, pitch, roll, yaw, and/or any other location information of the microwave backhaul node 122.1 through 122.k. The installer of the microwave backhaul node 122.m can retrieve the location information from other microwave backhaul nodes 122.1 through 122.k themselves and/or from the central management module 124 and use this location information to aim the PAFs of the microwave backhaul node 122.m toward these other microwave backhaul nodes.

As another example, the central management module 124 can gather status information for the microwave backhaul nodes 122.1 through 122.k. This status information can include loading of various microwave pathways between the microwave backhaul nodes 122.1 through 122.k, type of data to be communicated by the various microwave pathways, QoS of the various microwave pathways, power levels for the various microwave pathways, and/or data rates for the various microwave pathways to provide some examples. The installer of the microwave backhaul node 122.m can retrieve the location information from other microwave backhaul nodes 122.1 through 122.k and use this location information to aim the PAFs of the microwave backhaul node 122.m toward these other microwave backhaul nodes. The installer of the microwave backhaul node 122.m can retrieve the status information from other microwave backhaul nodes 122.1 through 122.k themselves and/or from the central management module 124 and use this location information to aim the PAFs of the microwave backhaul node 122.m toward these other microwave backhaul nodes.

Figure 2:
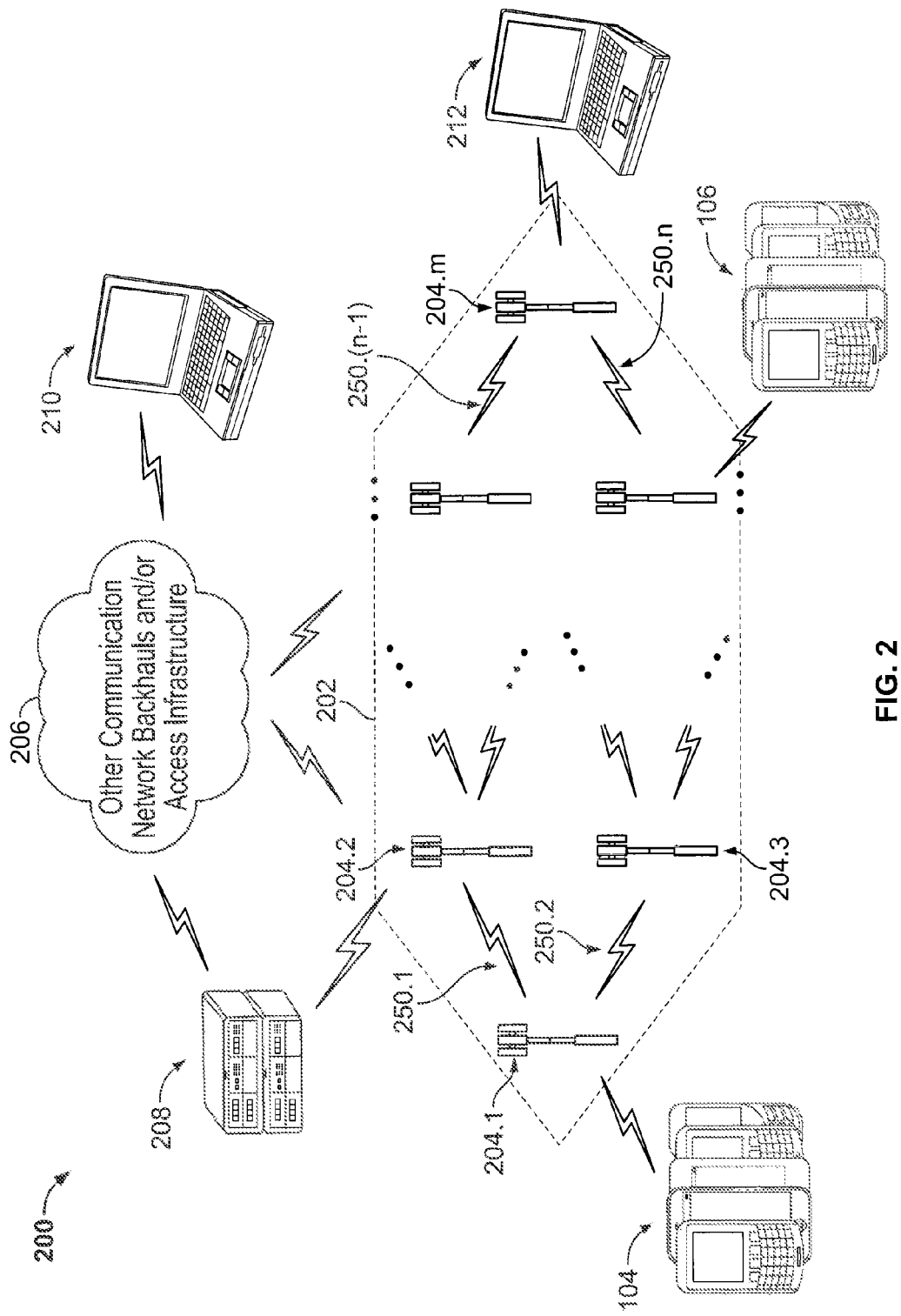
FIG. 2 illustrates a block diagram of a microwave backhaul according to an exemplary embodiment of the present disclosure.

FIG. 2 illustrates a block diagram of a microwave backhaul according to an exemplary embodiment of the present disclosure. A communications network 200 includes a microwave backhaul 202 to allow for communication of information, such as audio, video, or data to provide some examples, between the one or more near end mobile communications devices 104 and the one or more far end mobile communications devices 106. The communications network 200 can represent an exemplary embodiment of the communications network 120.

As shown in FIG. 2, the microwave backhaul 202 represents an interconnected network of microwave relays and/or microwave switches which allows for communication between the near end mobile communications devices 104 and the far end mobile communications devices 106. The microwave backhaul 202 includes one or more microwave backhaul nodes 204.1 through 204.m to route communications between the near end mobile communications devices 104 and the far end mobile communications devices 106. The microwave backhaul nodes 204.1 through 204.m represent a dynamically configurable switch fabric that can route communications through various microwave pathways 250.1 through 250.n of the microwave backhaul 202. Communications through the microwave backhaul 202 can traverse from one of the microwave backhaul nodes 204.1 through 204.m to other microwave backhaul nodes 204.1 through 204.m via one of the microwave pathways 250.1 through 250.m, commonly referred to as point-to-point. Each of the microwave backhaul nodes 204.1 through 204.m can represent an exemplary embodiment of one of the microwave backhaul nodes 122.1 through 122.k.

Also, communications through the microwave backhaul 202 can diverge from one of the microwave backhaul nodes 204.1 through 204.m through more than one of the microwave pathways 250.1 through 250.n to other microwave backhaul nodes 204.1 through 204.m, commonly referred to as point-to-multipoint. For example, as shown in FIG. 2, communications from the backhaul node 204.1 diverge to the backhaul node 204.2 via the microwave pathway 250.1 and the backhaul node 204.3 via the microwave pathway 250.2.

Additionally, communications through the microwave backhaul 202 can converge from multiple microwave backhaul nodes 204.1 through 204.m to one of the microwave backhaul nodes 204.1 through 204.m, commonly referred to as multipoint-to-point. As another example, as shown in FIG. 2, communications through the microwave backhaul 202 converge to the backhaul node 204.i via the microwave pathways 250.(n−1) and 250.n.

The microwave backhaul nodes 204.1 through 204.m can include a communications bridge to pass communications from other communications backhauls, such as a fiber-optic backhaul and/or a cable backhaul to provide some examples. Also, the communications bridge can pass local communications, such as those provided by the near end mobile communications devices 104 and/or the far end mobile communications devices 106 to provide some examples, to the microwave backhaul 202. For example, the near end mobile communications devices 104 and/or the far end mobile communications devices 106 can be operating in accordance WiMAX. In this example, the communications bridge processes these WiMAX communications for routing through the microwave backhaul 202.

As another example, the near end mobile communications devices 104 and/or the far end mobile communications devices 106 within a macrocell, a microcell, a picocell, and/or a femtocell can be operating in accordance the LTE communications standard. In this other example, the communications bridge processes these LTE communications from the near end mobile communications devices 104 and/or the far end mobile communications devices 106 themselves and/or via one or more base stations or access points within the macrocell, the microcell, the picocell, and/or the femtocell for routing through the microwave backhaul 202.

As also shown in FIG. 2, the microwave backhaul 202 can be, optionally, communicatively coupled to other communication network backhauls and/or access infrastructure 206. The other communication network backhauls and/or access infrastructure 206 represents other network backhauls that can include other microwave backhauls, fiber-optic backhauls and/or cable backhauls to provide some examples. For example, the microwave backhaul 202 can represent a backhaul provided by a first service provider while the other communication network backhauls and/or access infrastructure 206 can represent a different backhaul provided by a second service provider. Additionally, the other communication network backhauls and/or access infrastructure 206 can accommodate different communication protocols than that being presently utilized by the microwave backhaul 202.

Direct Management of Backhaul Nodes

The other communication network backhauls and/or access infrastructure 206 can be communicatively coupled to a central monitoring and control infrastructure 208 and/or to a remote monitoring and control infrastructure 210. The central monitoring and control infrastructure 208 represents a server infrastructure, such as a single server or multiple servers, that directly monitors and/or controls the microwave backhaul 202. The central monitoring and control infrastructure 208 can monitor the microwave backhaul nodes 204.1 through 204.m and dynamically configure routing of communications throughout the microwave backhaul nodes 204.1 through 204.m to meet network demands. For example, the central monitoring and control infrastructure 208 can dynamically configure the various microwave pathways 250.1 through 250.n of the microwave backhaul 202 to route communications throughout the microwave backhaul 202.

The remote monitoring and control infrastructure 210 can also directly manage the microwave backhaul nodes 204.1 through 204.m and dynamically configure routing of communications throughout the microwave backhaul nodes 204.1 through 204.m. Management can include assisting with the process of aiming at least a first portion of a first phased array feeder (PAF) of one of the backhaul nodes 204.1 through 204.m toward a second portion of a second PAF of another of the backhaul node 204.1 through 204.m. as well as establishing location information and status information for each of the backhaul nodes 204.1 through 204.m. Additionally, the microwave backhaul nodes 204.1 through 204.m can be monitored and/or managed via a local monitoring and control infrastructure 212. The remote monitoring and control infrastructure 210 and/or the local monitoring and control infrastructure 212 can directly manage the microwave backhaul nodes 204.1 through 204.m. Although the central monitoring and control infrastructure 208, the remote monitoring and control infrastructure 210, and the local monitoring and control infrastructure 212 are illustrated as wirelessly communicating with the microwave backhaul 202 and/or the other communication network backhauls and/or access infrastructure 206, those skilled in the relevant art(s) will recognize that the central monitoring and control infrastructure 208, the remote monitoring and control infrastructure 210, and the local monitoring and control infrastructure 212 can also use various wired communications without departing from the spirit and scope of the present disclosure.

Indirect Management of Backhaul Nodes

Alternatively, the remote monitoring and control infrastructure 210 and/or the local monitoring and control infrastructure 212 can indirectly manage the microwave backhaul nodes 204.1 through 204.m by sending requests via the other communication network backhauls and/or access infrastructure 206 and the microwave backhaul 202, respectively, to the central monitoring and control infrastructure 208. In this alternate, the central monitoring and control infrastructure 208 dynamically configures the routing of the communications throughout the microwave backhaul nodes 204.1 through 204.m in response to these requests.

Typically, in this alternate, the remote monitoring and control infrastructure 210 and/or the local monitoring and control infrastructure 212 accesses the central monitoring and control infrastructure 208 using an access point, such as a Wi-Fi access point to provide an example. The remote monitoring and control infrastructure 210 and/or the local monitoring and control infrastructure 212 can then securely, through authentication and/or authorization to provide some examples, access the central monitoring and control infrastructure 208 via a secure connection, such as a secure interface through a web browser to provide an example, through the access point. In this situation, the remote monitoring and control infrastructure 210 and/or the local monitoring and control infrastructure 212 sends requests via the secure connection to the central monitoring and control infrastructure 208 to indirectly manage the microwave backhaul nodes 204.1 through 204.*m*.

In another alternate, the remote monitoring and control infrastructure 210 and/or the local monitoring and control infrastructure 212 can directly manage some of the microwave backhaul nodes 204.1 through 204.*m* and indirectly manage other microwave backhaul nodes 204.1 through 204.*m* by sending requests via the other communication network backhauls and/or access infrastructure 206 and the microwave backhaul 202, respectively, to the central monitoring and control infrastructure 208. For example, the local monitoring and control infrastructure 212 can directly manage a first group of one or more of the microwave backhaul nodes 204.1 through 204.*m* while monitoring and/or managing of a second group of one or more of the microwave backhaul nodes 204.1 through 204.*m* requires indirect monitoring and/or managing.

Additionally, the remote monitoring and control infrastructure 210 and/or the local monitoring and control infrastructure 212 can directly manage some functionality of the backhaul nodes 204.1 through 204.*m* and indirectly manage others functionality of the backhaul nodes 204.1 through 204.*m* by sending requests via the other communication network backhauls and/or access infrastructure 206 and the microwave backhaul 202, respectively, to the central monitoring and control infrastructure 208. For example, the local monitoring and control infrastructure 212 can directly adjust some configurations, such as directionality of their PAFs to provide an example, of the microwave backhaul nodes 204.1 through 204.*m* while adjustment of other configurations such as QoS to provide an example requires indirect adjustment by sending a request to adjust via the microwave backhaul 202 to the central monitoring and control infrastructure 208.

Exemplary Backhaul Nodes that can be Used in the Backhaul Pathway

Various exemplary configurations and arrangements of various backhaul nodes, such as one or more of the backhaul nodes 204.1 through 204.*m*, are to be described in detail below. However these exemplary configurations and arrangements are not limiting, those skilled in the relevant art(s) will recognize that other configurations and arrangements of the various backhaul nodes are possible without departing from the spirit and scope of the present invention. For example, particular features, structures, or characteristics of one backhaul node can be combined with particular features, structures, or characteristics of one or more other backhaul nodes to form other configurations and arrangements for the various backhaul nodes.

Figure 3:
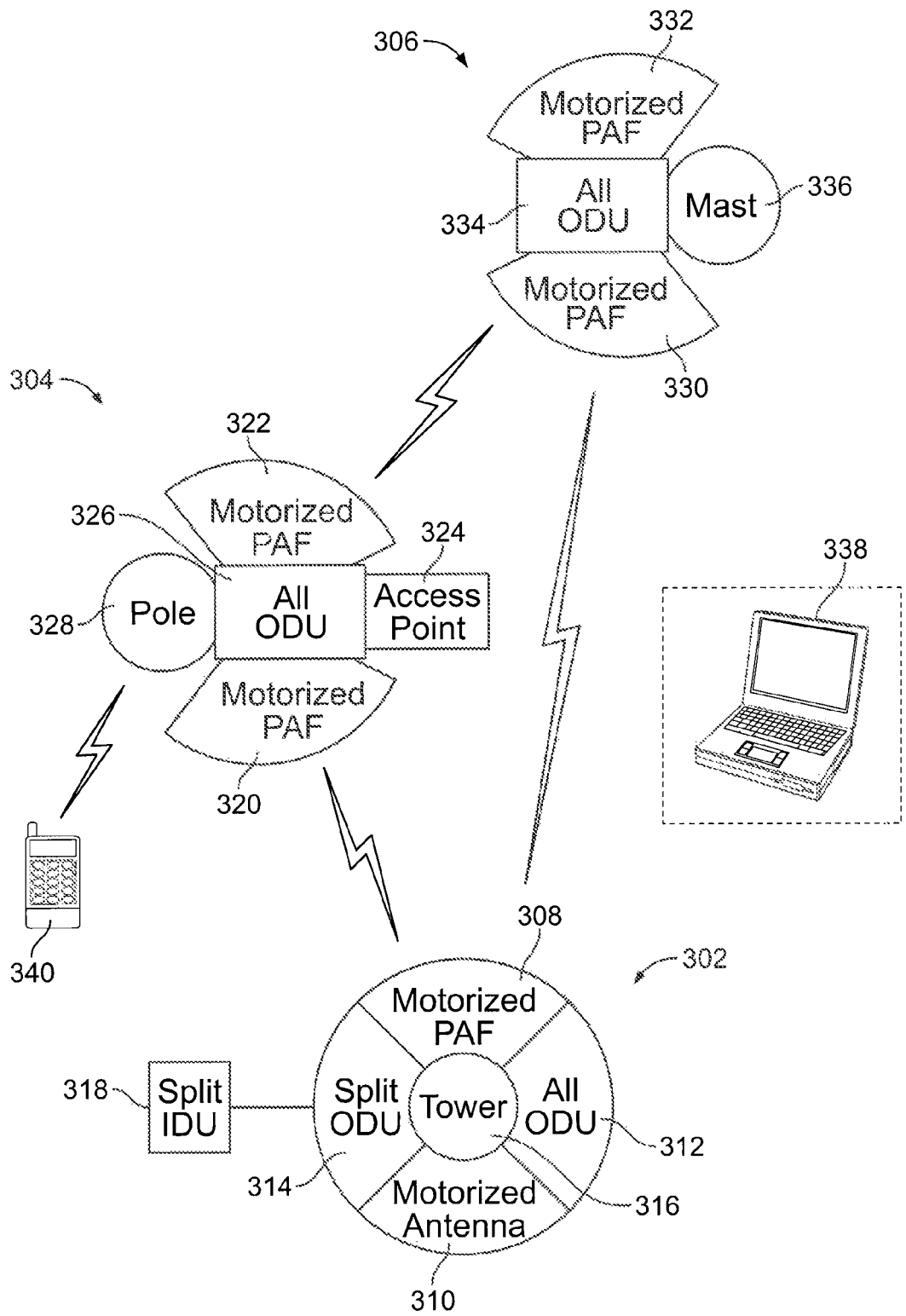
FIG. 3 illustrates various exemplary block diagrams of various microwave backhaul nodes that can be used in the microwave backhaul according to exemplary embodiments of the present disclosure.

FIG. 3 illustrates various exemplary block diagrams of various microwave backhaul nodes that can be used in the microwave backhaul according to exemplary embodiments of the present disclosure. A first exemplary microwave backhaul node 302, a second exemplary microwave backhaul node 304, and a third exemplary microwave backhaul node 306 can be implemented using any of the recent advancements in microwave backhaul nodes as described above and/or using any conventional technologies present in conventional backhaul nodes, such as any of the conventional backhaul nodes 108.1 through 108.*i* to provide an example. The first exemplary microwave backhaul node 302, the second exemplary microwave backhaul node 304, and/or the third exemplary microwave backhaul node 306 can represent an exemplary embodiment of any of the backhaul nodes 204.1 through 204.*m*.

The first exemplary microwave backhaul node 302 includes a motorized PAF 308, a motorized antenna 310, an all ODU 312, and a split ODU 314 mounted onto a tower 316. The tower 316 can be mounted on very large, stable ground-based masts, rooftops, and other existing structures, at vast distances apart at a height that provides a clear view over the surrounding buildings and terrain. The motorized PAF 308 provides wireless communications between the first exemplary microwave backhaul node 302 and the second exemplary microwave backhaul node 304 and/or the third exemplary microwave backhaul node 306. The motorized PAF 308 can include a PAF or a PAF coupled to an electromechanical device, such as an electric motor to provide an example. Likewise, the motorized antenna 310 provides wireless communications between other the first exemplary microwave backhaul node 302 and one or more other microwave backhaul nodes. The motorized antenna 310 can include any conventional antenna, also referred to as a legacy antenna, for wireless microwave transmission or any conventional antenna coupled to another electromechanical device, such as an electric motor to provide an example. The PAF and/or the conventional antenna are coarsely aimed at their respective microwave backhauls. Thereafter, the coarse aiming of the PAF and/or the conventional antenna can be finely adjusted by the electromechanical device.

The all ODU 312 and the split ODU 314 and split IDU 318 provide communications between the motorized PAF 308 and the motorized antenna 310 and various mobile communications devices such as the near end mobile communications devices 104 and/or the far end mobile communications devices 106 to provide some examples. For example, the all ODU 312 can communicate with the motorized PAF 308 while the split ODU 314 and split IDU 318 can communicate with the motorized antenna 310. As another example, the all ODU 312 can communicate with the motorized antenna 310 while the split ODU 314 and split IDU 318 can communicate with the motorized PAF 308.

The all ODU 312 provides functionality typical of a conventional ODU and a conventional IDU as well as a communications bridge to process communications from the access point 324 for routing by the second exemplary microwave backhaul node 304. This functionality of the conventional ODU and the conventional IDU can also be split between the split ODU 314 and the split IDU 318 which can also include a communications bridge. Additionally, the all ODU 312 and/or the split ODU 314 configure or partition the motorized PAF 308 to communicate with the second exemplary microwave backhaul node 304 over a first microwave pathway and to communicate with the third exemplary microwave backhaul node 306 over a second microwave pathway. For example, a first portion of the motorized PAF 308 can be partitioned, in time and/or frequency, to communicate with the second exemplary microwave backhaul node 304 and a second portion of the motorized PAF 308 can be partitioned, in time and/or frequency, to communicate with the third exemplary microwave backhaul node 306.

The second exemplary microwave backhaul node 304 includes a motorized PAF 320, a motorized PAF 322, an access point 324, and an all ODU 326 mounted onto a pole 328. The pole 328 represents a flimsy, less stable location, such as light poles, traffic signs, or telephone poles to provide some examples, when compared to the tower 316. The motorized PAF 320 and the motorized PAF 322 provides wireless communications between the second exemplary microwave backhaul node 304 and the first exemplary microwave backhaul node 302 and the third exemplary microwave backhaul node 306, respectively. The motorized PAF 320 and the motorized PAF 322 operate in a substantially similar manner as the motorized PAF 308.

The access point 324 provides communications between various mobile communications devices, such as the near end mobile communications devices 104 and/or the far end mobile communications devices 106 to provide some examples, within a macrocell, a microcell, a picocell, and/or a femtocell that can operating in accordance with any suitable wireless communication protocols, such as WiMAX, LTE, fourth generation (4G) mobile communications standards, third generation (3G) mobile communications standards, and/or Wi-Fi to provide some examples.

The all ODU 326 provides functionality typical of a conventional ODU and a conventional IDU as well as a communications bridge to process communications from the access point 324 for routing by the second exemplary microwave backhaul node 304. Additionally, the all ODU 326 can include one or more sensors to measure environmental conditions, such as humidity, precipitation, temperature or any other environmental condition, and/or location information, such as orientation, compass coordinates such as longitude and/or latitude, azimuth, altitude, pitch, roll, yaw, and/or any other location information to provide some examples, of the second exemplary microwave backhaul node 304 or a portion thereof such as the pole 328 to provide an example.

The third exemplary microwave backhaul node 306 includes a motorized PAF 330, a motorized PAF 332, and an all ODU 334 mounted onto a mast 336. The mast 328 represents a flimsy structure that is mounted to a stable location, such a side of a short building to provide an example. The motorized PAF 330 and the motorized PAF 332 provides wireless communications between the third exemplary microwave backhaul node 306 and the second exemplary microwave backhaul node 304 and one or more other microwave backhaul nodes. The motorized PAF 320 and the motorized PAF 322 operate in a substantially similar manner as the motorized PAF 308. The all ODU 334 provides communications between the motorized PAF 330 and the motorized PAF 332 and various mobile communications devices such as the near end mobile communications devices 104 and/or the far end mobile communications devices 106 to provide some examples in a substantially similar manner as the all ODU 312. Additionally, the all ODU 334 configures or partitions the motorized PAF 330 to communicate with the second exemplary microwave backhaul node 304 over a third microwave pathway and to communicate with the first exemplary microwave backhaul node 302 over the second microwave pathway.

Management of Exemplary Backhaul Nodes

The first exemplary microwave backhaul node 302, the second exemplary microwave backhaul node 304, and/or the third exemplary microwave backhaul node 306 can be automatically monitored and/or managed and/or monitored and/or managed by a remote monitoring and control infrastructure 338 and/or a local monitoring and control infrastructure 340. The remote monitoring and control infrastructure 338 can represent an exemplary embodiment of the central monitoring and control infrastructure 208 and/or the remote monitoring and control infrastructure 210 and the local monitoring and control infrastructure 340 can represent an exemplary embodiment of the local monitoring and control infrastructure 212.

In some situations, microwave backhaul nodes within a geographical area can be inadequate to meet network demands. For example, power usage between these microwave backhaul nodes can be relatively high and/or throughput between these microwave backhaul nodes can be relatively low. As another example, these microwave backhaul nodes can be inadequate to service a vast number of mobile communications devices that are requesting access. In these situations, additional microwave backhaul nodes can be installed within the geographical area to adequately meet network demands. The description below describes installing the second exemplary microwave backhaul node 304 within a geographical area that is presently serviced by the first exemplary microwave backhaul node 302 and the third exemplary microwave backhaul node 306 to meet network demands. However, this is not limiting, those skilled in the relevant art(s) will recognize that other microwave backhaul nodes can be installed into any geographical area in a substantially similar manner without departing from the spirit and scope of the present disclosure.

Prior to installing the motorized PAF 320, the motorized PAF 322, the access point 324, and the all ODU 326 onto the pole 328 of the second exemplary microwave backhaul node 304, the first exemplary microwave backhaul node 302 coarsely aims the motorized PAF 308 towards the motorized PAF 330 of the third exemplary microwave backhaul node 306. The first exemplary microwave backhaul node 302 can use Global Position System (GPS) information from the third exemplary microwave backhaul node 306 as well as its own GPS information along with the location information and wide beam to narrow beam target processing to coarsely aim the motorized PAF 308. Afterwards, the first exemplary microwave backhaul node 302 communicates with the third exemplary microwave backhaul node 306.

As discussed above, environmental factors, such as wind to provide an example, can cause movement, such as jitter or vibration, of the tower 316 and/or the mast 336. This movement of the tower 316 and/or the mast 336 can be quantified, typically in terms of the environmental conditions and/or the location information by the all ODU 334. The quantification of the movements allows the motorized PAF 308 and/or the motorized PAF 330 to be adjusted using their respective electromechanical devices to substantially compensate for the movement of the tower 316 and/or the mast 336. The first exemplary microwave backhaul node 302 and the third exemplary microwave backhaul node 306 can automatically adjust the motorized PAF 308 and the motorized PAF 330, respectively, or, alternatively, adjust the motorized PAF 308 and the motorized PAF 330 in response to communications from the remote monitoring and control infrastructure 338 and/or the local monitoring and control infrastructure 340.

The first exemplary microwave backhaul node 302 and the third exemplary microwave backhaul node 306 can be characterized as being separated by a long distance apart within the geographical area. This long distance causes the first exemplary microwave backhaul node 302 and the third exemplary microwave backhaul node 306 to communicate with relative high power levels and/or with relatively low throughput. To increase throughput, to allow for another local downstream bridging path, to increase tolerance to the environmental factors, and/or to provide addition redundancy, the second exemplary microwave backhaul node 304 can be installed within the geographical area.

During the installation, the motorized PAF 320, the motorized PAF 322, the access point 324, and the all ODU 326 are mounted onto the pole 328. The motorized PAF 320 and the motorized PAF 322 are simply aimed in approximate directions of the motorized PAF 308 and the motorized PAF 330, respectively. Afterwards, the all ODU 326 can be directed to automatically configure the motorized PAF 320 and the motorized PAF 322 to find, to target, and/or to develop optimal configurations for servicing communications between the motorized PAF 320 and the motorized PAF 308 and between the motorized PAF 322 and the motorized PAF 330, respectively. For example, a low power and/or low data rate communication is provided from the motorized PAF 320 and/or the motorized PAF 322, each of which are providing a wide beam, to the motorized PAF 308 and the motorized PAF 330, respectively. The power and/or data rate of this communication is incrementally increased and/or the beam is incrementally decreased while moving or adjusting the motorized PAF 320 and/or the motorized PAF 322 to target the motorized PAF 308 and the motorized PAF 330, respectively. Alternatively, the finding, the targeting, and/or the developing of the optimal configurations can be performed remotely from the remote monitoring and control infrastructure 338 and/or locally from the local monitoring and control infrastructure 340. In this alternate, the remote monitoring and control infrastructure 338 can be configured to execute hardware, software, or any combination thereof that is tailored for monitoring and controlling the first exemplary microwave backhaul node 302, the second exemplary microwave backhaul node 304, and/or the third exemplary microwave backhaul node 306.

Additionally, the first exemplary microwave backhaul node 302 and the third exemplary microwave backhaul node 306 can be reconfigured to detect communications from the second exemplary microwave backhaul node 304. This reconfiguration can include aiming the motorized PAF 308 and/or the motorized PAF 330 to communicate with the motorized PAF 320 and the motorized PAF 322, respectively. This reconfiguration can also include reconfiguring the all ODU 312, the split ODU 314, and/or the all ODU 334 to recognize communications from the first exemplary microwave backhaul node 304. This reconfiguration can also include dynamically reconfiguring or partitioning the motorized PAF 308 and/or the motorized PAF 330 to communicate with the motorized PAF 320 and the motorized PAF 330 and to communicate with the motorized PAF 308 and the motorized PAF 322, respectively.

After configuration of the second exemplary microwave backhaul node 304, the first exemplary microwave backhaul node 302 and the third exemplary microwave backhaul node 306 can begin to communicate with the second exemplary microwave backhaul node 304. The microwave pathways between the first exemplary microwave backhaul node 302 and the third exemplary microwave backhaul node 306 can be reallocated to include the second exemplary microwave backhaul node 304. For example, communications from the first exemplary microwave backhaul node 302 that are destined for the third exemplary microwave backhaul node 306 can be routed to the second exemplary microwave backhaul node 304 for routing onto the third exemplary microwave backhaul node 306.

As another example, communications from the first exemplary microwave backhaul node 302 and/or the third exemplary microwave backhaul node 306 that are destined for mobile communications devices, such as the one or more near end mobile communications devices 104 and the one or more far end mobile communications devices 106 to provide some examples, that are associated with the access point 324 can be routed to the second exemplary microwave backhaul node 304.

As a further example, some types of data and/or QoS can be routed from the first exemplary microwave backhaul node 302 to the third exemplary microwave backhaul node 306 while other types of data and/or QoS can be routed from the first exemplary microwave backhaul node 302 to the second exemplary microwave backhaul node 304 for routing onto the third exemplary microwave backhaul node 306.

As a yet further example, communications from the first exemplary microwave backhaul node 302 can be routed to the third exemplary microwave backhaul node 306 while communications from the third exemplary microwave backhaul node 306 can be routed to the second exemplary microwave backhaul node 304 for routing onto the first exemplary microwave backhaul node 302.

As an even further example, communications from the first exemplary microwave backhaul node 302 can be routed to the third exemplary microwave backhaul node 306 for a first instance in or first percentage of time while communications from the third exemplary microwave backhaul node 306 can be routed to the second exemplary microwave backhaul node 304 for routing onto the first exemplary microwave backhaul node 302 for a second instance in or second percentage of time.

The allocation of the microwave pathways between the first exemplary microwave backhaul node 302, the second exemplary microwave backhaul node 304, and/or the third exemplary microwave backhaul node 306 can occur automatically or be performed remotely from the remote monitoring and control infrastructure 338 and/or locally from the local monitoring and control infrastructure 340. In some situations, the reallocation of the microwave pathways can be a dynamically adjusted in response to network conditions, such as available bandwidth, loading of various microwave pathways, or type of data to be communicated to provide some examples. For example, communications between the first exemplary microwave backhaul node 302 and the third exemplary microwave backhaul node 306 can be reallocated to the second exemplary microwave backhaul node 304 when the microwave pathway between the first exemplary microwave backhaul node 302 and the third exemplary microwave backhaul node 306 can no longer network demands. This can occur, for example, when the microwave pathway between the first exemplary microwave backhaul node 302 and the third exemplary microwave backhaul node 306 is overloaded.

It is possible that the second exemplary microwave backhaul node 304 can become impaired as a result the environmental factors to provide an example. In this situation, communications from the first exemplary microwave backhaul node 302 to the second exemplary microwave backhaul node 304 that are destined for the third exemplary microwave backhaul node 306 can bypass the second exemplary microwave backhaul node 304 and be routed directly to the third exemplary microwave backhaul node 306. Additionally, it is also possible that one of the motorized PAFs, such as the motorized PAF 322 to provide an example, of the second exemplary microwave backhaul node 304 can become impaired. In this situation, communications from the first exemplary microwave backhaul node 302 that are destined for this impaired motorized PAF can be routed to the third exemplary microwave backhaul node 306 for routing onto another motorized PAF, such as the motorized PAF 322 to provide an example, of the second exemplary microwave backhaul node 304. This re-routing can occur automatically or be performed remotely from the remote monitoring and control infrastructure 338 and/or locally from the local monitoring and control infrastructure 340.

Figure 4:
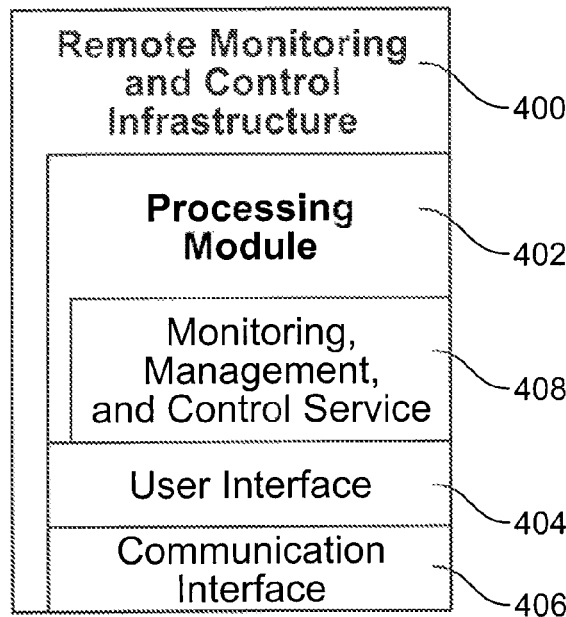
FIG. 4 illustrates a block diagram of an exemplary remote monitoring and control infrastructure for managing microwave backhaul nodes according to an exemplary embodiment of the present disclosure.

Exemplary Remote Monitoring and Control Infrastructure for Managing Microwave Backhaul Nodes FIG. 4 illustrates a block diagram of an exemplary remote monitoring and control infrastructure for managing microwave backhaul nodes according to an exemplary embodiment of the present disclosure. A remote monitoring and control infrastructure 400 can directly manage microwave backhaul nodes, such as one or more of the microwave backhaul nodes 204.1 through 204.m, the first exemplary microwave backhaul node 302, the second exemplary microwave backhaul node 304, and/or the third exemplary microwave backhaul node 306 to provide some examples, or indirectly manage the microwave backhaul nodes by sending requests to a central monitoring and control infrastructure, such as the central monitoring and control infrastructure 208 to provide an example. The remote monitoring and control infrastructure 400 includes a processing module, a user interface 404, and a communication interface 406. The remote monitoring and control infrastructure 400 can represent an exemplary embodiment of the remote monitoring and control infrastructure 210 and/or the remote monitoring and control infrastructure 338.

The processing module 402 controls overall configuration and operation of the remote monitoring and control infrastructure 400. The processing module 402 can be configured to execute monitoring, management, and control service 408 to manage the microwave backhaul nodes. In a direct management mode of operation, the processing module 402 and/or the monitoring, management, and control service 408 can directly, automatically configure routing of communications throughout the microwave backhaul nodes to meet network demands. For example, the processing module 402 can dynamically configure the microwave backhaul nodes to selectively route their communications among various microwave pathways. As another example, the processing module 402 can dynamically configure status information of the various microwave pathways, such as loading of the various microwave pathways, type of data to be communicated by the various microwave pathways, QoS of the various microwave pathways, power levels for the various microwave pathways, data rates for the various microwave pathways to provide some examples. As a further example, the processing module 402 can dynamically control the location information for the microwave backhaul nodes and/or configuration of various radios and/or interfaces within the microwave backhaul nodes, and/or partitioning of the various antennas to support the various microwave pathways. This dynamical control can include adjustment and/or control of orientation, compass coordinates such as longitude and/or latitude, azimuth, altitude, pitch, roll, yaw, and/or any other location information of the microwave backhaul nodes.

Additionally, the processing module 402 and/or the monitoring, management, and control service 408 can directly monitor communications throughout the microwave backhaul nodes and/or the microwave backhaul nodes themselves. For example, the processing module 402 can monitor the microwave backhaul nodes for impairments and dynamically configure the microwave backhaul nodes to selectively route their communications to circumvent any impairments once detected. Alternatively, the processing module 402 can dynamically adjust the control various operational parameters of the microwave backhaul nodes to correct for any impairment once detected. As another example, the processing module 402 can monitor the parameters of the various microwave pathways to ensure that network demands are met and dynamically cause the microwave backhaul nodes to adjust their respective microwave pathways when network demands are not met. As a further example, the processing module 402 can monitor the operational parameters of the microwave backhaul nodes.

Alternative to directly configuring, the processing module 402 and/or the monitoring, management, and control service 408 can indirectly manage the microwave backhaul nodes by sending requests to the central monitoring and control infrastructure in an indirect management mode of operation. Typically, in this alternate, the processing module 402 can securely, through authentication and/or authorization to provide some examples, access the central monitoring and control infrastructure via a secure connection, such as a secure interface through a web browser to provide an example, through the access point. In this situation, the processing module 402 sends requests via the secure connection to the central monitoring and control infrastructure to indirectly manage the microwave backhaul nodes in a substantially similar manner as with the direct management mode of operation.

The user interface 406 provides a user interface for an operator of the remote monitoring and control infrastructure 400 to interface with the central monitoring and control infrastructure, the microwave backhaul nodes, and/or the remote monitoring and control infrastructure 400 itself. The operator of the remote monitoring and control infrastructure 400 can directly or indirectly configure routing of communications throughout the microwave backhaul nodes to meet network demands by sending requests to the processing module 402, the central monitoring and control infrastructure, and/or the microwave backhaul nodes using the user interface 406. Additionally, the operator of the remote monitoring and control infrastructure 400 can directly monitor communications throughout the microwave backhaul nodes and/or the microwave backhaul nodes themselves using the user interface 406.

The communication interface 406 provides communications between the remote monitoring and control infrastructure 400 and the central monitoring and control infrastructure and/or the microwave backhaul nodes via various wired and/or wireless communication pathways.

Figure 5:
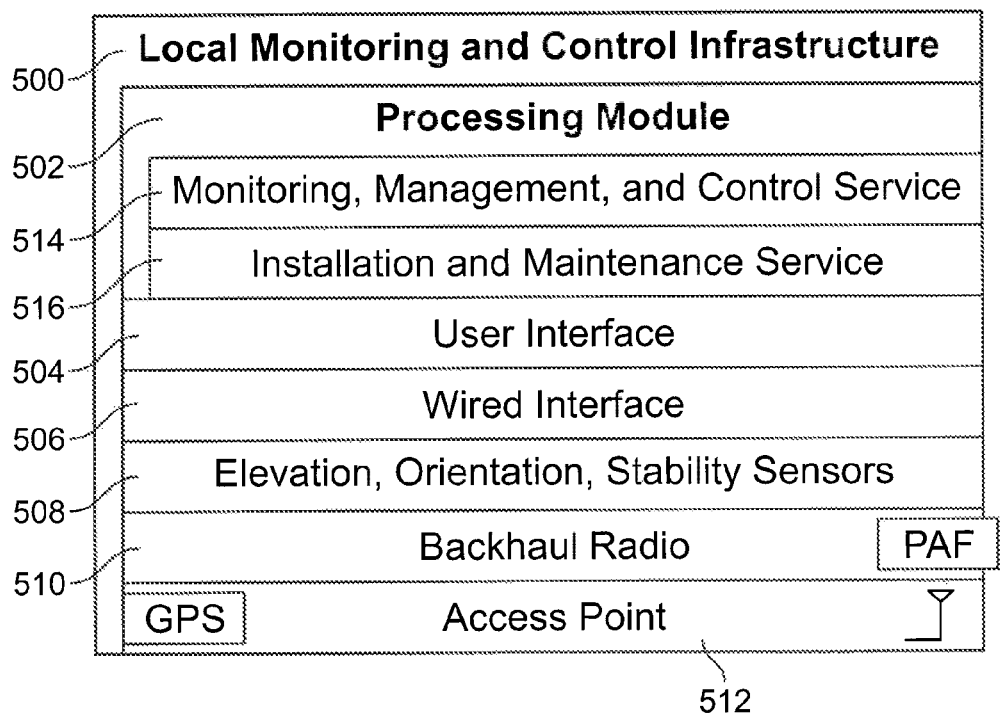
FIG. 5 illustrates a block diagram of an exemplary local monitoring and control infrastructure for managing microwave backhaul nodes according to an exemplary embodiment of the present disclosure.

Exemplary Local Monitoring and Control Infrastructure for Managing Microwave Backhaul Nodes FIG. 5 illustrates a block diagram of an exemplary local monitoring and control infrastructure for managing microwave backhaul nodes according to an exemplary embodiment of the present disclosure. A local monitoring and control infrastructure 500 can manage microwave backhaul nodes, such as one or more of the microwave backhaul nodes 204.1 through 204.m, the first exemplary microwave backhaul node 302, the second exemplary microwave backhaul node 304, and/or the third exemplary microwave backhaul node 306 to provide some examples. The local monitoring and control infrastructure 500 also includes various functionality for installation and/or configuration of additional microwave backhaul nodes into a microwave backhaul, such as the microwave backhaul 202 to provide an example. The remote monitoring and control infrastructure 502 includes a processing module 502, a user interface 504, a wired interface 506, elevation, orientation, stability sensors 508, a backhaul radio 510, and an access point 512. The remote monitoring and control infrastructure 500 can represent an exemplary embodiment of the local monitoring and control infrastructure 212 and/or the local monitoring and control infrastructure 340.

The processing module 502 controls overall configuration and operation of the local monitoring and control infrastructure 500. The processing module 502 can be configured to execute monitoring, management, and control service 514 to manage the microwave backhaul nodes in a substantially similar manner as the processing module 402 executes the monitoring, management, and control service 408. Additionally, the processing module 502 can be configured to execute installation and maintenance service 516 for installation and/or configuration of additional microwave backhaul nodes into the microwave backhaul. The installation and maintenance service 516 can provide installation procedures and routines for the installation of additional microwave backhaul nodes as well as testing procedures and routines for testing these newly installed microwave backhaul nodes. Additionally, the installation and maintenance service 516 can provide various configuration parameters automatically and/or in response to commands to configure these newly installed microwave backhaul nodes for operation.

The user interface 504 provides a user interface for an operator of the local monitoring and control infrastructure 500 to interface with the central monitoring and control infrastructure, the microwave backhaul nodes, and/or the remote monitoring and control infrastructure 500 itself in a substantially similar manner as the user interface 406. Additionally, the operator of the local monitoring and control infrastructure 500 can install and/or configure additional microwave backhaul nodes into the microwave backhaul using the user interface 504.

The wired interface 506 represents a wired communications pathway between the remote monitoring and control infrastructure 500 and the microwave backhaul nodes, typically a newly added microwave backhaul node. The wired interface 506 can be used for communications between this newly added microwave backhaul and the local monitoring and control infrastructure 500. For example, the wired interface 506 can provide configuration information to this newly added microwave backhaul node using the wired communications pathway.

The elevation, orientation, and stability sensors 508 measure elevation, orientation, and stability information of the remote monitoring and control infrastructure 500. This information can be used to aim various antennas of the microwave backhaul nodes.

The backhaul radio 510 provides wireless communications between the remote monitoring and control infrastructure 500 and the microwave backhaul nodes. The backhaul radio 510 can optionally include a PAF for these communications.

The access point 512 provides wireless communications between the remote monitoring and control infrastructure 500 and other communications devices, such as the one or more near end mobile communications devices 104, the one or more far end mobile communications devices 106, and/or one or more microwave backhauls to provide some examples. The access point 512 can also receive GPS information relating to a location of the remote monitoring and control infrastructure 500 to be used to aim the various antennas of the microwave backhaul nodes. The access point 512 can provide access between the remote monitoring and control infrastructure 500 and other communications devices that can be operating in accordance with any suitable wireless communication protocol, such as WiMAX, LTE, 4G mobile communications standards, 3G mobile communications standards, and/or Wi-Fi to provide some examples.

Exemplary Microwave Backhaul Node

Figure 6:
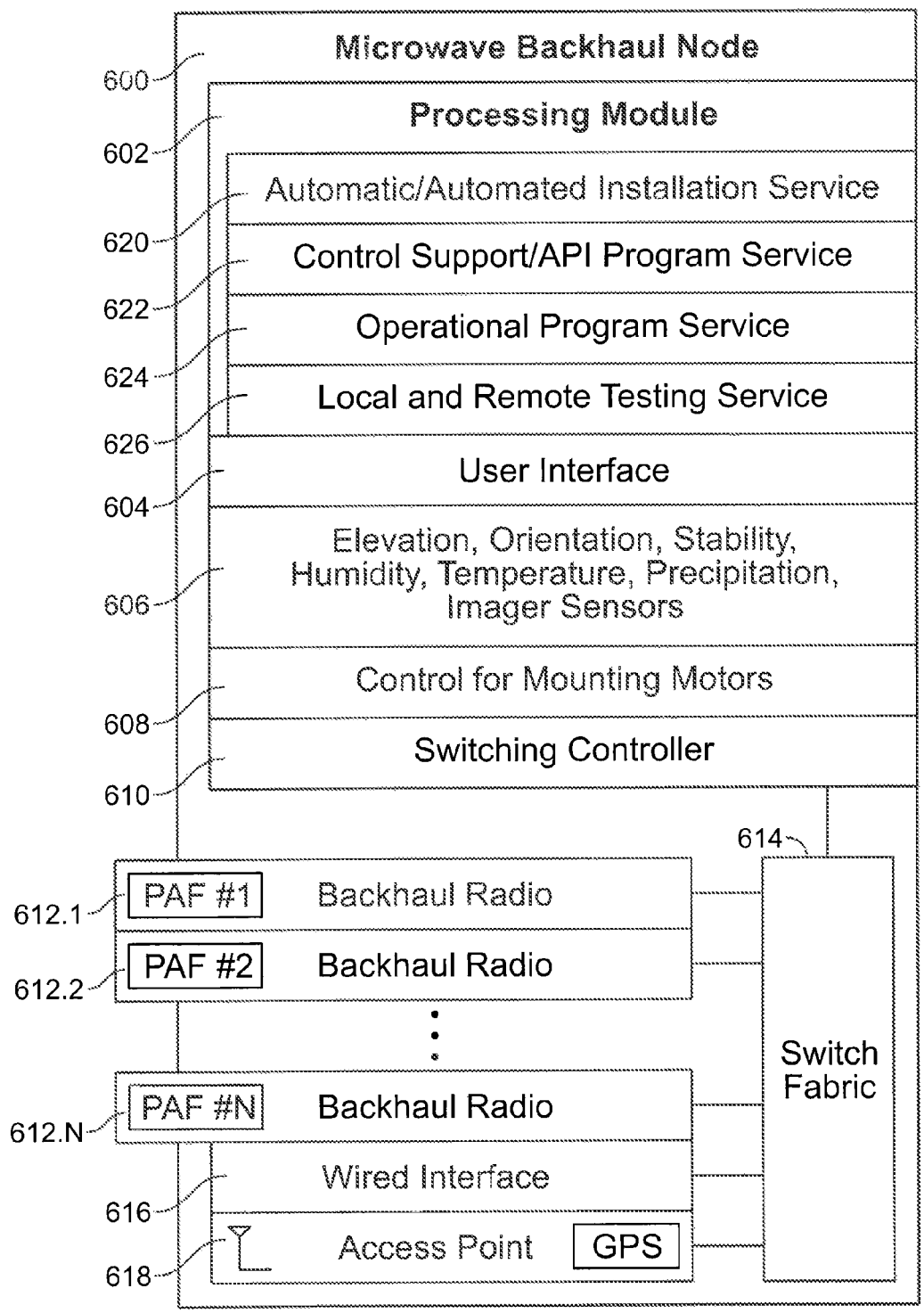
FIG. 6 illustrates another exemplary block diagram of a microwave backhaul node that can be used in the microwave backhaul according to an exemplary embodiment of the present disclosure.

FIG. 6 illustrates another exemplary block diagram of a microwave backhaul node that can be used in the microwave backhaul according to an exemplary embodiment of the present disclosure. A microwave backhaul node 600 can be one of many microwave backhaul nodes within a microwave backhaul, such as the microwave backhaul 202 to provide an example, which allows for communication of information, such as audio, video, or data to provide some examples, between mobile communications devices, such as the one or more near end mobile communications devices 104 and the one or more far end mobile communications devices 106 to provide some examples. The microwave backhaul node 600 can be directly managed by a central monitoring and control infrastructure, such as the central monitoring and control infrastructure 208 to provide an example, a remote monitoring and control infrastructure, such as the remote monitoring and control infrastructure 210, the remote monitoring and control infrastructure 338, and/or the remote monitoring and control infrastructure 400 to provide some examples, and/or a local monitoring and control infrastructure, such as the local monitoring and control infrastructure 212, the local monitoring and control infrastructure 340, and/or the local monitoring and control infrastructure 500 to provide some examples.

Additionally, the microwave backhaul node 600 can be indirectly managed by the remote monitoring and control infrastructure and/or the local monitoring and control infrastructure using the central monitoring and control infrastructure. The microwave backhaul node 600 includes a processing module 602, a user interface 604, elevation, orientation, stability, humidity, temperature, precipitation, imager sensors 606, control for mounting motors 608, a switching controller 610, backhaul radios 612.1 through 612.N, a switch fabric 614, a wired interface 616, and an access point 618. The microwave backhaul node 600 can represent an exemplary embodiment of any of the microwave backhaul nodes 204.1 through 204.*m*, the first exemplary microwave backhaul node 302, the second exemplary microwave backhaul node 304, and/or the third exemplary microwave backhaul node 306.

The processing module 602 controls overall configuration and operation of the microwave backhaul node 600. The processing module 602 can be configured to execute automatic/automated installation service 620 to configure operation of the microwave backhaul node 600. The automatic/automated installation service 620 can be automatically executed and/or executed under the control of the local monitoring and control infrastructure after installation of the microwave backhaul node 600.

The automatic/automated installation service 620 can operate in conjunction other software, hardware, and/of firmware modules to assist an installer of the microwave backhaul node 600 to aim various PAFs to their respective microwave backhaul nodes. Typically, the automatic/automated installation service 620 assists in a process of aiming at least a first portion of a first phased array feeder (PAF) of a first backhaul node toward a second portion of a second PAF of a second backhaul node. For example, the automatic/automated installation service 620 can execute various testing procedures and routines for testing the microwave backhaul node 600 from the local and remote testing service 626 to determine various parameters of various microwave pathways, such as loading of the various microwave pathways, type of data to be communicated by the various microwave pathways, QoS of the various microwave pathways, power levels for the various microwave pathways, data rates for the various microwave pathways to provide some examples, from the local and remote testing code. As another example, the automatic/automated installation service 620 can provide environmental conditions, such as humidity, precipitation, temperature or any other environmental condition, and/or location information, such as GPS) information, orientation, compass coordinates such as longitude and/or latitude, azimuth, altitude, pitch, roll, yaw, and/or any other location information from the control support/application programming interface (API) program service 622 to the installer of the microwave backhaul node 600. Additionally, the automatic/automated installation service 620 can download and/or execute software and/or firmware updates from the central monitoring and control infrastructure, the remote monitoring and control infrastructure and/or the local monitoring and control infrastructure for various modules of the microwave backhaul node 600.

Additionally, the processing module 602 can be configured to execute control support/application programming interface (API) program service 622. The control support/application programming interface (API) program service 622 operates as an interface between the automatic/automated installation service 620 and the elevation, orientation, stability, humidity, temperature, precipitation, imager sensors 606 and/or between the automatic/automated installation service 620 and the access point 618. For example, the control support/application programming interface (API) program service 622 manages the elevation, orientation, stability, humidity, temperature, precipitation, imager sensors 606 to provide the environmental conditions and/or the location information. The control support/application programming interface (API) program service 622 can request the environmental conditions and/or the location information from the elevation, orientation, stability, humidity, temperature, precipitation, imager sensors 606 at periodic intervals and/or can poll the elevation, orientation, stability, humidity, temperature, precipitation, imager sensors 606 for the environmental conditions and/or the location information.

In some situations, the central monitoring and control infrastructure, the remote monitoring and control infrastructure and/or the local monitoring and control infrastructure can remotely provide the environmental conditions and/or the location information via the access point 618. In these situations, the control support/application programming interface (API) program service 622 manages the access point 618 to provide the environmental conditions and/or the location information, such as GPS information to provide an example. The control support/application programming interface (API) program service 622 can request the environmental conditions and/or the location information from the access point 618 at periodic intervals and/or can poll the access point 618 for the environmental conditions and/or the location information.

Further, the processing module 602 can be configured to execute operational program service 624. The operational program service 624 can automatically manage overall configuration and operation of the microwave backhaul node 600. For example, the operational program service 624 manages parameters of the various microwave pathways, such as loading of the various microwave pathways, type of data to be communicated by the various microwave pathways, QoS of the various microwave pathways, power levels for the various microwave pathways, data rates for the various microwave pathways to provide some examples. As another example, the operational program service 624 manages allocation of the various microwave pathways between the microwave backhaul node 600 and other microwave backhaul nodes of a communications network, such as the communications network 200 to provide an example. As a further example, the operational program service 624. Alternatively, the operational program service 624 can provide configuration and operation to the central monitoring and control infrastructure, the remote monitoring and control infrastructure and/or the local monitoring and control infrastructure to be used for configuration and operation of the microwave backhaul node 600.

Yet further, the processing module 602 can be configured to execute local and remote testing service 626. The local and remote testing service 626 includes installation procedures and routines for the installation of the microwave backhaul node 600 as well as testing procedures and routines for testing the microwave backhaul node 600. For example, a low power and/or low data rate communication can be provided by backhaul radios 612.1 through 612.N via their respective PAFs, each of which are providing a wide beam. The local and remote testing service 626 causes an incremental increase in the power and/or data rate of this and/or an incremental decrease in the beam while causing the control for mounting motors 608 to move or adjust the PAFs, to target other microwave backhaul nodes. Typically, the installation procedures and routines and/or the testing procedures and routines are provided by the central monitoring and control infrastructure, the remote monitoring and control infrastructure and/or the local monitoring and control infrastructure.

The user interface 604 provides a user interface for an operator of the microwave backhaul node 600 to interface with the central monitoring and control infrastructure, the microwave backhaul nodes, and/or the microwave backhaul node 600 itself in a substantially similar manner as the user interface 406.

The elevation, orientation, stability, humidity, temperature, precipitation, imager sensors 606 include one or more sensors to provide the environmental conditions and/or the location information. In some situations, the elevation, orientation, stability, humidity, temperature, precipitation, imager sensors 606 can include an imaging device to provide various images of the microwave backhaul node 600. These various images can be used by the viewed by the central monitoring and control infrastructure, the remote monitoring and control infrastructure and/or the local monitoring and control infrastructure to assist in detection of impairments that can be present within the microwave backhaul node 600.

The control for mounting motors 608 can adjust directions such as orientation, azimuth, altitude, pitch, roll, and/or yaw of the PAFs.

The switching controller 610 can configure and arrange various switches of the switch fabric 614 to route communications between the backhaul radios 612.1 through 612.N and/or between the backhaul radios 612.1 through 612.N the access point 618. For example, the switching controller 610 can configure and arrange the switch fabric 614 to route communications received from a first microwave backhaul node via a first backhaul radio 612.1 onto a second backhaul radio 612.2 for transmission onto to a second microwave backhaul node. As another example, the switching controller 610 can configure and arrange the switch fabric 614 to route communications received from a first microwave backhaul node via a first backhaul radio 612.1 onto the access point 618 for transmission onto one or more mobiles communications devices, such as the one or more near end mobile communications devices 104 and the one or more far end mobile communications devices 106 to provide some examples.

The backhaul radios 612.1 through 612.N include various microwave transceivers to communicate with other microwave backhaul nodes via the PAF #1 through PAF #N. The backhaul radios 612.1 through 612.N can be directly configured by the processing module 602 and/or indirectly by the central monitoring and control infrastructure, the remote monitoring and control infrastructure and/or the local monitoring and control infrastructure. This configuration can include activation/deactivation, types and QoS of communication flow to be supported, transmit power level, and/or data rates. The backhaul radios 612.1 through 612.N can additional control partitioning of their PAF #1 through PAF #N to support the various microwave pathways.

The wired interface 616 represents a wired communications pathway between the microwave backhaul node 600 and the central monitoring and control infrastructure, the remote monitoring and control infrastructure and/or the local monitoring and control infrastructure.

The access point 618 provides wireless communications between the microwave backhaul node 600 in a substantially similar manner as the access point 512.

CONCLUSION

It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A monitoring and control system for managing a plurality of backhaul nodes in a microwave backhaul, the monitoring and control system comprising:
    a transceiver; and
    a physical processing module configured to provide:
    a first service configured to assist in a process of aiming a first portion of a first phased array feeder (PAF) of a first backhaul node from among the plurality of backhaul nodes toward a first portion of a second PAF of a second backhaul node from among the plurality of backhaul nodes, the aiming being in response to movement of the first backhaul node caused by an environmental factor, and
    a second service configured to establish location information and status information for the plurality of backhaul nodes, the status information being received via communication exchanges with the plurality of backhaul nodes, and wherein the first service is further configured to reconfigure the first backhaul node to be communicatively coupled to a third backhaul node from among the plurality of backhaul nodes when the location information or the status information indicates an impairment in the second backhaul node as a result of an environmental factor, the reconfiguring comprising aiming the first portion of the first PAF to a first portion of a third PAF of a third backhaul node when the second backhaul node is impaired.

2. The monitoring and control system of claim 1, wherein the processing module is further configured to provide:
    a third service configured to selectively route communications between the plurality of backhaul nodes.

3. The monitoring and control system of claim 2, wherein the third service is further configured to dynamically configure a plurality of microwave pathways between the plurality of backhaul nodes based upon the status information.

4. The monitoring and control system of claim 2, wherein the third service is further configured to route communications from the first backhaul node to a third backhaul node from among the plurality of backhaul nodes upon an impairment of the second backhaul node.

5. The monitoring and control system of claim 1, wherein the first service is further configured to dynamically configure and arrange the first portion of the first PAF to provide a plurality of microwave pathways, at least one of the plurality of microwave pathways being communicatively coupled to the first portion of the second PAF.

6. The monitoring and control system of claim 5, wherein the first service is further configured to logically separate the first PAF to provide the plurality of microwave pathways.

7. The monitoring and control system of claim 1, wherein the status information comprises:
    loading of the plurality of backhaul nodes;
    type of data to be communicated by the plurality of backhaul nodes;
    Quality of Service (QoS) of the plurality of backhaul nodes;
    power levels for the plurality of backhaul nodes; or
    data rates for the plurality of backhaul nodes.

8. The remote monitoring and control infrastructure of claim 1, wherein the location information comprises:
    orientation of the plurality of backhaul nodes;
    compass coordinates of the plurality of backhaul nodes;
    azimuth of the plurality of backhaul nodes;
    altitude of the plurality of backhaul nodes;
    pitch of the plurality of backhaul nodes;
    roll of the plurality of backhaul nodes; or
    yaw of the plurality of backhaul nodes.

9. The remote monitoring and control infrastructure of claim 1, wherein the first service is further configured to quantify the movement of the first backhaul node in terms of the environmental factor to adjust the first PAF to compensate for the movement of the first backhaul node.

10. The remote monitoring and control infrastructure of claim 1, wherein the environmental factor comprises wind.

11. A first backhaul node in a microwave backhaul, comprising:
    a pole configured to be moved by an environmental factor; a first phased array feeder (PAF), mounted to the pole, configured to wirelessly communicate with a plurality of backhaul nodes in the microwave backhaul using a plurality of microwave pathways;
    a sensor configured to determine location information and status information for the backhaul node; and
    a physical processing module configured to dynamically configure the first PAF of the first backhaul node to provide the location information and the status information to a remote central control system via the plurality of microwave pathways, the dynamically configuring comprising aiming the first PAF of the backhaul node in response to movement of the pole caused by the environmental factor and wherein the processing module is further configured to re-direct the first backhaul node to be communicatively coupled to a second backhaul node of the plurality of backhaul nodes when a third backhaul node of the plurality of backhaul nodes coupled to the first backhaul node is impaired as a result of a second environmental factor effecting the third backhaul node, the re-directing comprising aiming a first portion of the first PAF of the first backhaul node to a first portion of a first PAF of the second backhaul node.

12. The first backhaul node of claim 11, wherein the status information comprises:
loading of the first backhaul node;
type of data to be communicated by the first backhaul node;
Quality of Service (QoS) of the first backhaul node;
power levels for the first backhaul node; or
data rates for the first backhaul node.

13. The first backhaul node of claim 11, wherein the location information comprises:
orientation of the first backhaul node;
compass coordinates of the first backhaul node;
azimuth of the first backhaul node;
altitude of the first backhaul node;
pitch of the first backhaul node;
roll of the first backhaul node; or
yaw of the first backhaul node.

14. The first backhaul node of claim 11, wherein the processing module is further configured to dynamically configure the first PAF of the first backhaul node to aim the first portion of the first PAF of the first backhaul node toward a first portion of a first PAF of the third backhaul node and to communicate the location information and the status information to the remote central control system using the first portion of the first PAF of the first backhaul node.

15. The first backhaul node of claim 14, wherein the processing module is further configured to dynamically configure and arrange the first PAF of the first backhaul node to provide the plurality of microwave pathways, at least one of the plurality of microwave pathways being communicatively coupled to the first portion of the first PAF of the third backhaul node.

16. The first backhaul node of claim 15, wherein the processing module is further configured to logically separate the first PAF of the first backhaul node to provide the plurality of microwave pathways.

17. The first backhaul node of claim 11, wherein the processing module is further configured to quantify the movement of the pole in terms of the environmental factor to adjust the of the first PAF to compensate for the movement of the pole.

18. The first backhaul node of claim 11, wherein the environmental factor comprises wind.

19. A monitoring and control system for managing a plurality of backhaul nodes in a microwave backhaul, the plurality of backhaul nodes including a first backhaul node that is communicatively coupled to a second backhaul node, the monitoring and control system comprising:

a transceiver; and
a physical processing module configured to provide:
a first service configured to assist in a process of configuring the plurality of backhaul nodes, the plurality of backhaul nodes each including an associated wireless access point and switch fabric circuitry, a portion of the process of configuring being associated with a portion of the associated wireless access point and switch fabric circuitry, and
a second service configured to establish location information and status information for the plurality of backhaul nodes, the status information being received via communication exchanges with the plurality of backhaul nodes,
wherein the first service is further configured to reconfigure the first backhaul node to be communicatively coupled to a third backhaul node from among the plurality of backhaul nodes when the location information or the status information indicates an impairment in the second backhaul node as a result of an environmental factor,
wherein the process of configuring comprises aiming a portion of a first phased array feeder (PAF) of the first backhaul node to a portion of a second PAF of the second backhaul node in response to movement of the first backhaul node or of the second backhaul caused by an environmental factor; and
wherein the reconfiguring comprises aiming the portion of the first PAF to a portion of a third PAF of the third backhaul node when the second backhaul node is impaired.

20. The monitoring and control system of claim 19, wherein the first service is further configured to dynamically configure and arrange the first PAF to provide a plurality of microwave pathways, at least one of the plurality of microwave pathways being communicatively coupled to the first portion of the second PAF.

21. The monitoring and control system of claim 19, wherein the status information comprises:
loading of the plurality of backhaul nodes;
type of data to be communicated by the plurality of backhaul nodes;
Quality of Service (QoS) of the plurality of backhaul nodes;
power levels for the plurality of backhaul nodes; or
data rates for the plurality of backhaul nodes.

22. The monitoring and control system of claim 19, wherein the location information comprises:
orientation of the plurality of backhaul nodes;
compass coordinates of the plurality of backhaul nodes;
azimuth of the plurality of backhaul nodes;
altitude of the plurality of backhaul nodes;
pitch of each of the plurality of backhaul nodes;
roll of the plurality of backhaul nodes; or yaw of the plurality of backhaul nodes.

23. The remote monitoring and control infrastructure of claim 19, wherein the first service is further configured to quantify the movement of the first backhaul node or movement of the second backhaul node such that the first backhaul node compensates for the movement of the second backhaul node or the movement of the first backhaul node.

24. The remote monitoring and control infrastructure of claim 19, wherein the environmental factor comprises wind.

* * * * *